(12) United States Patent
Skull et al.

(10) Patent No.: US 6,944,374 B2
(45) Date of Patent: Sep. 13, 2005

(54) OPTICAL FIBER THERMAL COMPENSATION DEVICE

(75) Inventors: Paul Andrew Skull, Winchester (GB); Matthew Roy Hill, Southampton (GB)

(73) Assignee: Southhampton Photonics Ltd, Southhampton (GB)

(*) Notice: Subject to any disclaimer, the term of this patent is extended or adjusted under 35 U.S.C. 154(b) by 0 days.

(21) Appl. No.: 10/858,306

(22) Filed: Jun. 1, 2004

(65) Prior Publication Data

US 2004/0218863 A1 Nov. 4, 2004

Related U.S. Application Data

(62) Division of application No. 10/209,764, filed on Aug. 1, 2002, now abandoned.

(30) Foreign Application Priority Data

Aug. 3, 2001 (GB) .............................................. 0119033

(51) Int. Cl.[7] .............................................. G02B 6/34
(52) U.S. Cl. .............................. 385/37; 385/15; 385/27; 385/31; 385/137; 398/81; 398/82; 398/87
(58) Field of Search ............................. 385/15, 27, 31, 385/37, 137; 398/81, 82, 87

(56) References Cited

U.S. PATENT DOCUMENTS

| | | | |
|---|---|---|---|
| 5,602,955 A | | 2/1997 | Haake |
| 5,999,671 A | | 12/1999 | Jin et al. |
| 6,148,128 A | * | 11/2000 | Jin et al. ....................... 385/37 |
| 6,181,851 B1 | | 1/2001 | Pan et al. |
| 6,374,015 B1 | * | 4/2002 | Lin .............................. 385/37 |
| 6,453,092 B1 | * | 9/2002 | Trentelman ................... 385/37 |
| 6,771,858 B2 | * | 8/2004 | Bourcier et al. ............... 385/37 |
| 2002/0141700 A1 | * | 10/2002 | Lachance et al. ............. 385/37 |
| 2003/0081925 A1 | * | 5/2003 | Albert ......................... 385/137 |

FOREIGN PATENT DOCUMENTS

| | | |
|---|---|---|
| WO | WO9859267 | 12/1998 |
| WO | WO0033034 | 6/2000 |
| WO | WO0072059 | 11/2000 |
| WO | WO0120377 | 3/2001 |
| WO | WO0137015 | 5/2001 |
| WO | WO0148522 | 7/2001 |

* cited by examiner

*Primary Examiner*—Akm Enayet Ullah
*Assistant Examiner*—Daniel Petkovsek
(74) *Attorney, Agent, or Firm*—John S. Reid

(57) ABSTRACT

An optical filter having at least one optical fiber component and a thermal compensation device which includes a first, second and third member in which the thermal compensation device has a first and a second fixing point, the first, second and third members are made from materials having first, second and third thermal expansion coefficients, the optical fiber component is attached to the thermal compensation device at the first and the second fixing points thus defining a composite thermal expansion. The optical filter is such that the composite thermal expansion compensates for thermal behavior of the optical fiber component.

17 Claims, 14 Drawing Sheets

OPTICAL FIBER THERMAL COMPENSATION DEVICE

CROSS REFERENCE TO RELATED APPLICATIONS

This application is a divisional patent application under 35 U.S.C. §120 of U.S. patent application Ser. No. 10/209.764, filed Aug. 1, 2002 now abandoned, which in turn claims priority to United Kingdom, Patent Application no. 0119033.9, filed Aug. 3, 2001 in the United Kingdom both of which are hereby incorporated by reference herein in their entirety.

FIELD OF THE INVENTION

This invention relates to a thermal compensation device that provides passive thermal compensation for an optical fiber component.

BACKGROUND OF THE INVENTION

High speed, high capacity optical communication systems are increasingly based upon optical networks employing dense-wavelength-division-multiplexing (DWDM) technology whereby many optical wavelength channels are transmitted along an optical fiber simultaneously.

The wavelength channels are defined in grids whereby each wavelength channel is separated by 200 GHz, 100 GHz, 50 GHz or 25 GHz from the next wavelength channel. The trend is to increase the number of channels and also to increase the bandwidth of each channel. This has led to two different extreme requirements, namely wavelength channels transmitting at 40 Gbit/s on a 100 or 50 GHz grid, and wavelength channels transmitting at 10 Gbit/s on a 50 GHz or 12.5 GHz grid. Given that there are numerous optical components such as optical sources, filters, multiplexers in the network, the wavelength accuracy of each optical component becomes increasingly important. This requirement is likely to become even more demanding as the grid sizes become even more closely packed (e.g. 12.5 GHz, 6.25 GHz or even 1 GHz) and the bandwidth efficiency becomes even higher.

Optical components not only have to be manufactured to operate at a specified wavelength, they also need to do so over wide temperature and humidity ranges and for extended periods of time. This requirement is made more difficult owing to variation of optical performance of the optical components with temperature. For example, the center wavelength of a typical fiber Bragg grating device will vary by approximately 10 pm per deg C. Thus over a 100° C. temperature variation, the wavelength will shift by approximately 1 nm corresponding to an optical frequency shift of approximately 125 GHz at 1550 nm.

There is therefore a requirement for a thermal compensation device that stabilizes the performance of optical components, compensates for thermal variations within the optical component, and is applicable for volume manufacturing processes with high yield. The thermal compensation device design is preferably hermetic.

An additional requirement is that the thermal compensation device should enable individual devices to be tuned during manufacture.

Yet a further requirement is to provide a thermal compensation device that allows multiple components to be incorporated within the same thermal compensation device and that allows each of these components to be tuned individually to its correct operating wavelength.

An aim of the present invention is to provide a thermal compensation device with improved tuneability.

SUMMARY OF THE INVENTION

According to a non-limiting embodiment of the present invention there is provided an optical filter comprising at least one optical fiber component and a thermal compensation device comprising a first, second and third member in which the thermal compensation device has a first and a second fixing point, the first, second and third members are made from materials having first, second and third thermal expansion coefficients, the optical fiber component is attached to the thermal compensation device at the first and the second fixing points thus defining a composite thermal expansion, the optical filter being such that the composite thermal expansion compensates for the thermal behavior of the optical fiber component.

It is preferred that the first, second and third members are configured such that the thermal compensation device experiences a substantially zero bending moment induced by strain in the optical fiber component.

At least-one of the first, second and third members can include a flange.

The optical fiber component can be selected from the group comprising a filter, a fiber Bragg grating, a multiplexer grating, a demultiplexer grating, an add grating, a drop grating, a dispersion compensator, an optical gain shaper, a wavelength locker, a sensor grating, a distributed feedback fiber laser and a fiber laser.

The optical filter can have an operating wavelength having a desired wavelength.

The first and third thermal expansion coefficients can be substantially equal. The second thermal expansion coefficient can be larger than the first and third thermal expansion coefficients.

It is preferable that the composite thermal expansion is negative and of such a value that it compensates the changes in operating characteristics of the optical filter with temperature. The composite thermal expansion is preferably in the range $-4\times10^{-6}$ to $-15\times10^{-6}$ for compensating thermal changes in fiber Bragg gratings written into silica optical fibers doped with germanium.

At least one of the first, second and third members can be a cylinder.

The first, second and third members can be cylinders, which can be concentric.

The optical fiber component can be attached to the first and the second fixing points using a glass solder, which is preferably such as to form an hermetic seal. This is particularly advantageous because the operating wavelength can be tuned during manufacture to the desired wavelength while the glass solder is flowed.

The second and the third cylinder can be joined with a first fixing means during manufacture to form an interim assembly. The first cylinder can be joined to the interim assembly using a second fixing means. It is preferable that the first and second fixing means are hermetic seals. The first and second fixing means can be a laser weld, a metal solder, a Eutectic, a glass solder, an adhesive, an epoxy, a UV cured adhesive, a thermally cured adhesive and any weld or brazing technique or a mechanical clamp.

It is preferable that the second fixing means is a laser weld and the operating wavelength is tuned to the desired wavelength while joining the first cylinder to the interim assembly.

The optical filter can be such that the difference between the length of the thermal compensation device and the length of the optical component is independent of the length of the optical component. Advantageously, the length of the thermal compensation device can be less than 20 mm longer than the longitudinal length separating the first and the second fixing points. Longer optical filters, for example 30 mm or 50 mm longer can also be designed using this approach, although shorter optical filters are generally more desirable.

It is desirable for a 100 GHz dense wavelength division multiplexing (DWDM) optical network, that the optical filter is of such a design that the operating wavelength can be tuned to within ±10 pm of a desired wavelength at an ambient temperature. It is desirable that the operating wavelength has a temperature-dependent wavelength variation of less than 35 pm over the range −5° C. to +70° C. It is further desirable that the operating wavelength does not drift by more than 10 pm over the 25 year operating lifetime of the filter at a fixed temperature.

It is desirable for a 50 GHz DWDM optical network, that the optical filter is of such a design that the operating wavelength can be tuned to within ±10 pm of a desired wavelength at an ambient temperature. It is desirable that the optical filter has a temperature-dependent wavelength variation of less than 35 pm over the range −5° C. to +70° C. It is further desirable that the operating wavelength does not drift by more than 10 pm over the 25 year operating lifetime of the filter at a fixed temperature.

It is desirable for a 25 GHz DWDM optical network, that the optical filter is of such a design that the operating wavelength can be tuned to within ±5 pm of a desired wavelength at an ambient temperature. It is desirable that the optical filter has a temperature-dependent wavelength variation of less than 30 pm over the range −5° C. to +70° C. It is further desirable that the operating wavelength does not drift by more than 10 pm over the 25 year operating lifetime of the filter at a fixed temperature.

It is desirable for a 12.5 GHz DWDM optical network, that the optical filter is of such a design that the operating wavelength can be tuned to within ±3 pm of a desired wavelength at an ambient temperature. It is desirable that the optical filter has a temperature-dependent wavelength variation of less than 20 pm over the range −5° C. to +70° C. It is further desirable that the operating wavelength does not drift by more than 5 pm over the 25 year operating lifetime of the filter at a fixed temperature.

It is desirable for a 6.25 GHz DWDM optical network, that the optical filter is of such a design that the operating wavelength can be tuned to within ±2 pm of a desired wavelength at an ambient temperature. It is desirable that the optical filter has a temperature-dependent wavelength variation of less than 6 pm over the range −5° C. to +70° C. It is further desirable that the operating wavelength does not drift by more than 4 pm over the 25 year operating lifetime of the filter at a fixed temperature.

It is desirable for a DWDM optical network having a channel separation between 1 GHz and 6.25 GHz that the optical filter is of such a design that the operating wavelength can be tuned to within ±1 pm of a desired wavelength at an ambient temperature and has a temperature-dependent wavelength variation of less than 3 pm over the range −5° C. to +70° C.

The optical filter can include a plurality of optical fiber components connected in series or in parallel. The optical filter can further include ferrules such that each optical fiber component can be tuned independently from the other optical fiber components.

The invention also provides a method of manufacturing an optical filter wherein the optical fiber component is characterized by an operating wavelength of a selected wavelength, and wherein the optical filter includes an optical fiber component attached to a thermal compensation device at first and second fixing points. The method includes the steps of inserting the optical fiber component into the thermal compensation device and applying strain to the optical fiber component. Glass solder is then flowed to attach the optical fiber component to the thermal compensation device at the first and the second fixing points. The method further includes measuring the operating wavelength of the optical fiber component, adjusting the strain applied to the optical fiber component to tune the operating wavelength to the selected wavelength, and allowing the glass solder to solidify. The step of measuring the operating wavelength of the optical fiber component is carried out prior to adjusting the strain applied to the optical fiber component to tune the operating wavelength, and the step of allowing the glass solder to solidify is carried out after (but not necessarily directly after) adjusting the strain applied to the optical fiber component to tune the operating wavelength.

The invention also provides a method of manufacturing an optical filter wherein the optical filter includes an optical fiber component attached to a thermal compensation device at first and second fixing points, the method comprising the steps of inserting the optical fiber component into the thermal compensation device, applying strain to the optical fiber component, and flowing glass solder to attach the optical fiber component to the thermal compensation device at the first and the second fixing points.

The optical fiber component can have an operating wavelength having a desired wavelength.

The method can further include the steps of prior to flowing the glass solder, measuring the operating wavelength of the optical fiber component, and adjusting the strain applied to the optical fiber component to tune the operating wavelength to the desired wavelength. The strain can be adjusted while flowing the glass solder.

The optical fiber component can be attached to the first fixing point prior to tuning the operating wavelength to the desired wavelength.

The method can further include the steps of measuring and feeding back the operating wavelength while flowing the glass solder in order to tune the operating wavelength to the desired wavelength. This is a particularly advantageous aspect of the invention because the steps of measuring and feeding back the operating wavelength while flowing the glass solder can be carried out more than once including at a much later date if it is desired to retune the optical filter.

The glass solder can be flowed using a heating method selected from the group comprising an induction heater, an electric current heating technique, a resistance welder, hot gas, hot glass injection and direct heating.

The method can also include measuring the operating wavelength of the optical fiber component; and flowing the glass solder on either the first or the second fixing point while adjusting the strain applied to the optical fiber component to tune the operating wavelength to the desired wavelength.

The operating wavelength can be tuned by mechanically distorting the thermal compensation device.

The optical filter can be environmentally annealed prior to measuring the operating wavelength and flowing the glass solder. The form of environmental annealing can be thermal, pressure or humidity. The annealing can be effected by placing the optical filter in an environmental chamber.

The thermal compensation device can include a single mechanical component that can be formed from a negative expansion coefficient material such as a glass or a ceramic. The thermal compensation device can include more than one mechanical component that can be formed from materials including negative expansion coefficient materials such as a glass or a ceramic.

The thermal compensation device includes first, second and third members. At least one of the first, second and third members can be a cylinder.

The thermal compensation device can be formed by laser welding the first member to the second member to form an interim assembly, and laser welding the third member to the interim assembly.

The thermal compensation device can further include third and fourth fixing points outside of the first and the second fixing points, and the method can further include the step of attaching the optical fiber component to the third and the fourth fixing points to provide strain relief. The optical fiber component can be bent between the first and third fixing points.

Fluid can be injected into the thermal compensation device. The fluid can be an oil, a grease, a gel, an ink, a liquid metal, or a heat-sinking compound. The thermal compensation device can further include a heat sink. The heat sink can be inserted into or welded onto the first member. Heat sinking and/or ensuring a uniform temperature distribution along the optical fiber component can be important in the design of axially thermally sensitive optical fiber components such as distributed feedback fiber lasers.

The invention also provides a method of manufacturing an optical filter wherein the optical filter includes an optical fiber component attached to a thermal compensation device at first and second fixing points, wherein the thermal compensation device includes first, second and third members, the method comprising the steps of laser welding the first and second members together to form an interim assembly, attaching the optical fiber component to one of the interim assembly and the third member, attaching the optical fiber component to the other one of the interim assembly and the third member, applying strain to the optical fiber component, and laser welding the third member to the interim assembly.

The third member can be assembled onto the interim assembly prior to attaching the optical fiber component to either the interim assembly or the third member.

The optical fiber component can have an operating wavelength having a desired wavelength.

The method can further include the steps prior to laser welding the third member to the interim assembly of measuring the operating wavelength of the optical fiber component, and adjusting the strain applied to the optical fiber component to tune the operating wavelength to the desired wavelength.

The optical fiber component can be attached to the thermal compensation device using a glass solder.

The method can further include the steps of measuring and feeding back the operating wavelength while flowing the glass solder in order to tune the operating wavelength to the desired wavelength. The steps of measuring and feeding back the operating wavelength while flowing the glass solder can be carried out more than once. The glass can be flowed using a heating method selected from the group comprising an induction heater, an electric current heating technique, a resistance welder, hot gas, hot glass injection and direct heating.

The optical fiber component can be attached to the thermal compensation device using one of a group comprising an epoxy, an eutectic, an adhesive including a UV-cured adhesive, an acrylic-based adhesive or a mechanical clamp.

The thermal compensation device can further include a third and fourth fixing point outside of the first and the second fixing points, and the optical fiber component can be attached to the third and the fourth fixing points to provide strain relief. The optical fiber component can be bent between the first and third fixing point in order to improve the strain relief.

These and other aspects and embodiments of the present invention will now be described in detail with reference to the accompanying drawings, wherein:

DETAILED DESCRIPTION OF PREFERRED EMBODIMENTS OF THE INVENTION

Figure 1:
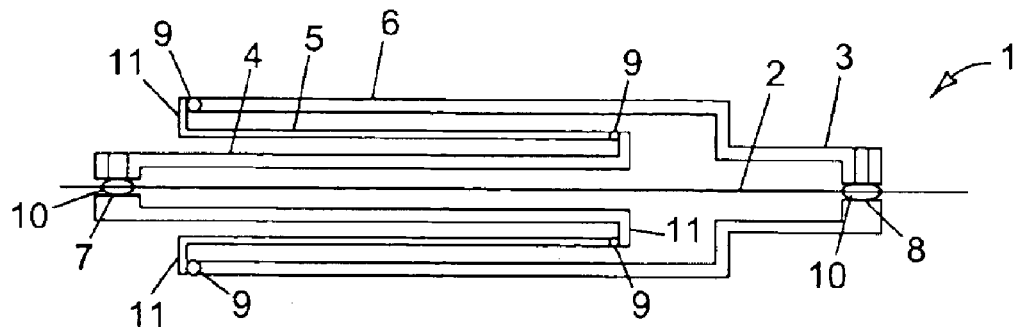
FIG. 1 depicts an optical filter according to the present invention.

With reference to FIG. 1, there is provided an optical filter 1 having at least one optical fibre component 2 and a thermal compensation device 3 comprising a first, second and third member 4, 5, 6 in which the thermal compensation device 3 has a first and a second fixing point 7, 8, the first, second and third members 4, 5, 6 are made from materials having respective first, second and third thermal expansion coefficients, the optical fibre component 2 is attached to the thermal compensation device 3 at the first and the second fixing points 7, 8 thus defining a composite thermal expansion. The optical filter 1 is such that the composite thermal expansion compensates for thermal behaviour of the optical fibre component 2.

It is preferred that the first, second and third members 4, 5, 6 are configured such that the thermal compensation device 3 experiences a substantially zero bending moment induced by strain in the optical fiber component 2.

The first, second and third members 4, 5, 6 are shown joined together with a fixing means 9 which can be a weld, a braze, a solder, an interference fit, a screw, or an adhesive. The first and second members 4, 5 preferably include flanges 11 as shown in FIG. 1 in order to define better the axial location of the components relative to each other. It has been found experimentally that designs incorporating flanges 11 have less variation in their composite thermal expansion.

The optical fibre component 2 is attached to the thermal compensation device 3 with an adhesive means 10 which can be an adhesive or a mechanical clamp. The adhesive can be any material that joins two components together, so that, for example, the adhesive can be an epoxy, an eutectic, an adhesive including a UV-cured adhesive, a solder, a glass solder, and an acrylic-based adhesive. The optical fibre component 2 can be coated with a metal coating or a carbon based coating over any or all of its length. This can be preferred in order to improve the yield and performance of seals within the thermal compensation device 3. This can also be preferred in order to alter the thermal characteristics of the optical fibre component 2. An electric current can be passed along the coating to generate a resistive heating effect.

Figure 2A:
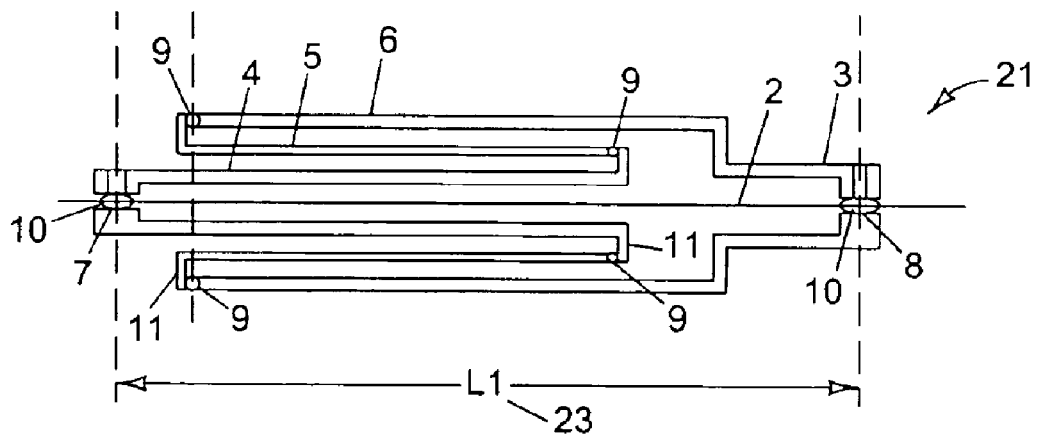
FIGS. 2A and 2B combined provide a definition of composite thermal expansion.
Figure 2B:
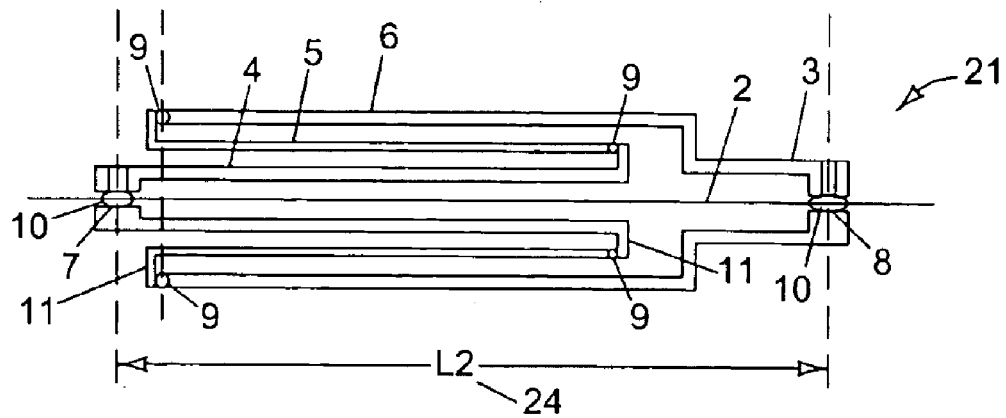

FIGS. 2A and 2B together depict first and second optical filters 21, 22 which are identical in design and construction to each other. The first optical filter 21 has an effective length L1 23 at a temperature T1, and the second optical filter 22 has an effective length L2 24 at a temperature T2, where T2 is greater than T1. The effective lengths 23, 24 are shown in FIGS. 2A and 2B as being the distance between the first and second fixing points 7, 8. The first and third thermal expansion coefficients are assumed to be zero and thus the lengths of the first and third members 4, 6 are the same in the first and second optical filters 21, 22. The second thermal expansion coefficient is positive and consequently the second member 5 is longer in the second optical filter 22 than in the first optical filter 21. The result is that the effective length L1 23 is longer than the effective length L2 24, that is, the effective length of the optical filter 1 has been designed to reduce with increasing temperature. The composite thermal expansion coefficient can be defined as $(L2-L1)/(T2-T1)$ and in this example is negative.

The composite thermal expansion coefficient can be designed to be positive or negative by suitable choices of the first, second and third thermal expansion coefficients and the lengths of the first, second and third members 4, 5, 6. It is preferred that the first and third members 4, 6 are made from a nickel iron alloy such as Nilo® 36, Nilo® 42, Nilo® 48, Nilo® 475 or Nilo® K, commonly referred to as Invar® alloy (Invar® is a registered trademark of Imphy S. A. Corporation of France Paris France), and the second member 5 is a stainless steel. (Nilo® is a registered trademark of Inco Alloys International, Inc. of Huntington, West Va.) Other suitable choices for the first and third members 4 and 6 include other negative or low-thermal expansion materials including alloys and composites such as titanium and beryllium, glasses for example Schott zerodur, Corning ULE, silica, fluorosilicate and borosilicate, and ceramics. Choices for the second member 5 include high-expansion materials including alloys and composites such as aluminum, copper, nickel and alloys of aluminum, copper and nickel.

The first and third thermal expansion coefficients can be substantially equal. The second thermal expansion coefficient can be larger than the first and third thermal expansion coefficients.

It is preferable that the composite thermal expansion is negative and of such a value that it compensates for the changes in operating characteristics of the optical filter 1 with temperature. The composite thermal expansion is preferably in the range $-4 \times 10^{-6}$ to $-15 \times 10^{-6}$ for compensating thermal changes in fiber Bragg gratings written into silica optical fibers doped with germanium.

The optical fiber component 2 can be selected from the group comprising a filter, a fiber Bragg grating, a multiplexer grating, a demultiplexer grating, an add grating, a drop grating, an add-drop grating, a dispersion compensator, an optical gain shaper, a wavelength locker, a sensor grating, a distributed feedback fiber laser and a fiber laser. Add gratings, drop gratings and add-drop gratings are fiber Bragg gratings used in optical multiplexers for adding and/or dropping wavelength channels at nodes in DWDM optical networks.

Figure 3:
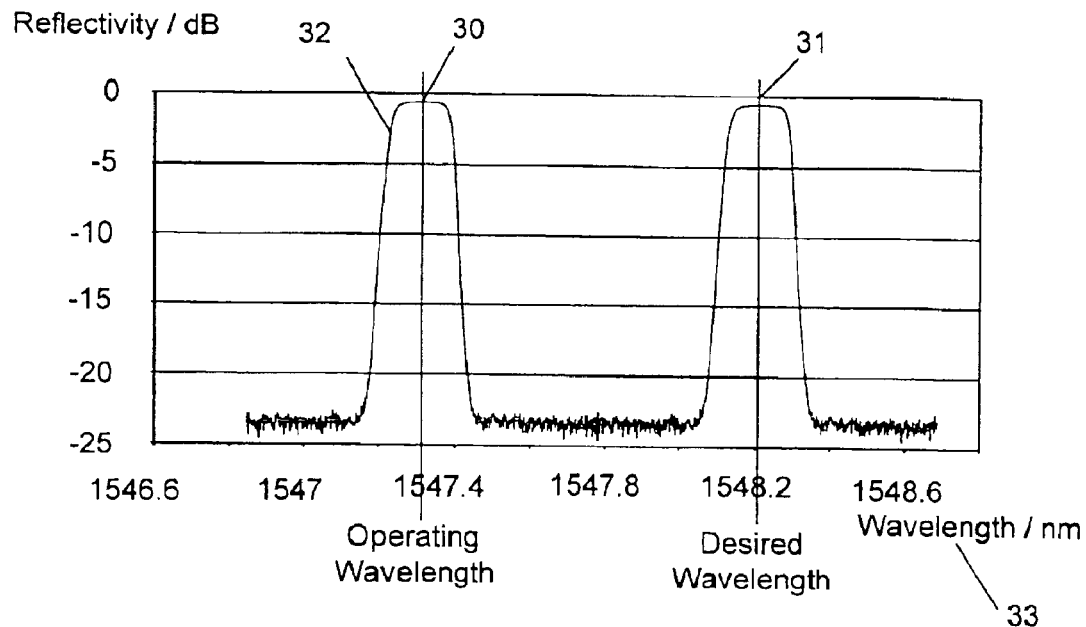
FIG. 3 depicts the operating wavelength of a fiber Bragg grating.
Figure 4:
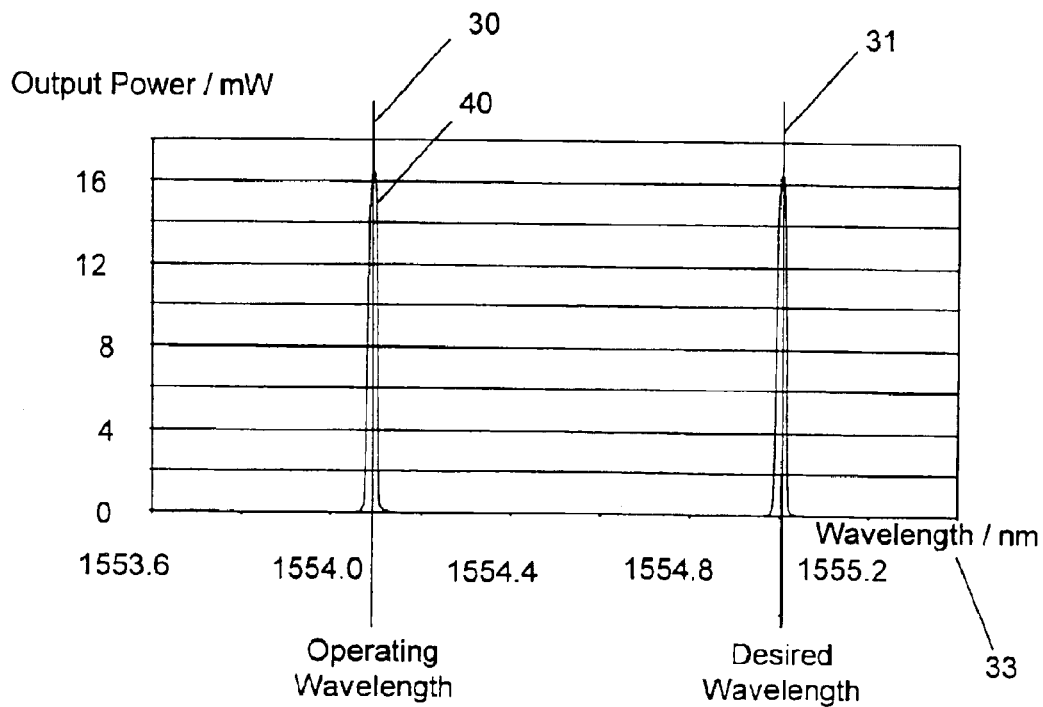
FIG. 4 depicts the operating wavelength of a fiber laser.

The optical filter 1 can have an operating wavelength 30 having a selected, or "desired" wavelength 31. This is shown by reference in FIGS. 3 and 4, which show the variation of reflectivity 32 with wavelength 33 for a typical fiber Bragg grating and the variation of output power 40 with wavelength 33 for a typical fiber laser respectively. The operating wavelength 30 and the desired wavelength 31 are identified in FIGS. 3 and 4 for each of these applications. The design of the thermal compensation device 3 should be selected to enable the optical filter 1 to operate as close as possible to the desired wavelength 31 of the operating wavelength 30 over a wide temperature and humidity range and over extended periods of time.

Figure 5:
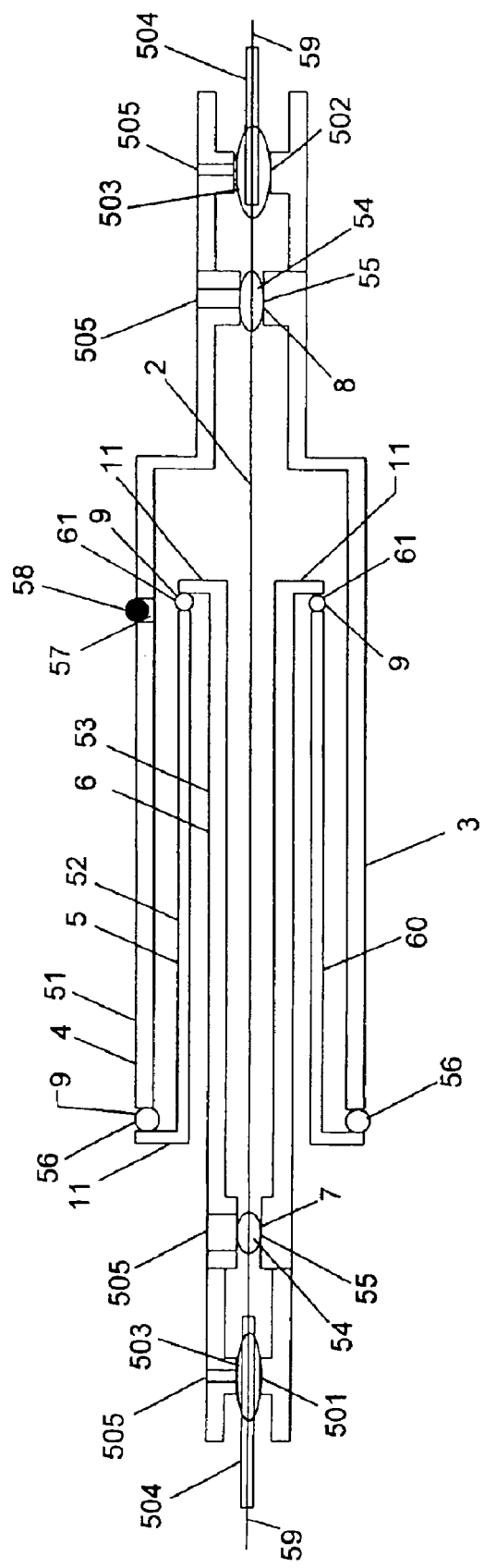
FIG. 5 depicts an optical filter comprising first, second and third cylinders.

At least one of the first, second and third members 4, 5, 6 can be a cylinder. FIG. 5 depicts an optical filter 1 wherein the first, second and third members 4, 5, 6 are a first, second and third cylinders 51, 52, 53, which are concentric. The cylinders can be structures that are cylindrical, or that extend longitudinally and include a longitudinal hole or slit. So for example, by cylinders we are also including, both here and with reference to the other figures, tubes and other longitudinal structures that have a circular, elliptical, square, rectangular or other non-circular cross-section and include structures in which the cross-sectional shape can vary along the length such as tapered or stepped structures which may for example contain holes, slots, groves and ridges. And by concentric with reference to these non-circular structures, we mean that they share a common central longitudinal axis.

The optical fiber component 2 can be attached to the first and the second fixing points 7, 8 using a glass solder 54 to form an hermetic seal 55. This is particularly advantageous because the operating wavelength 30 can be tuned during manufacture to the desired wavelength 31 while the glass solder 54 is flowed.

Figure 6:
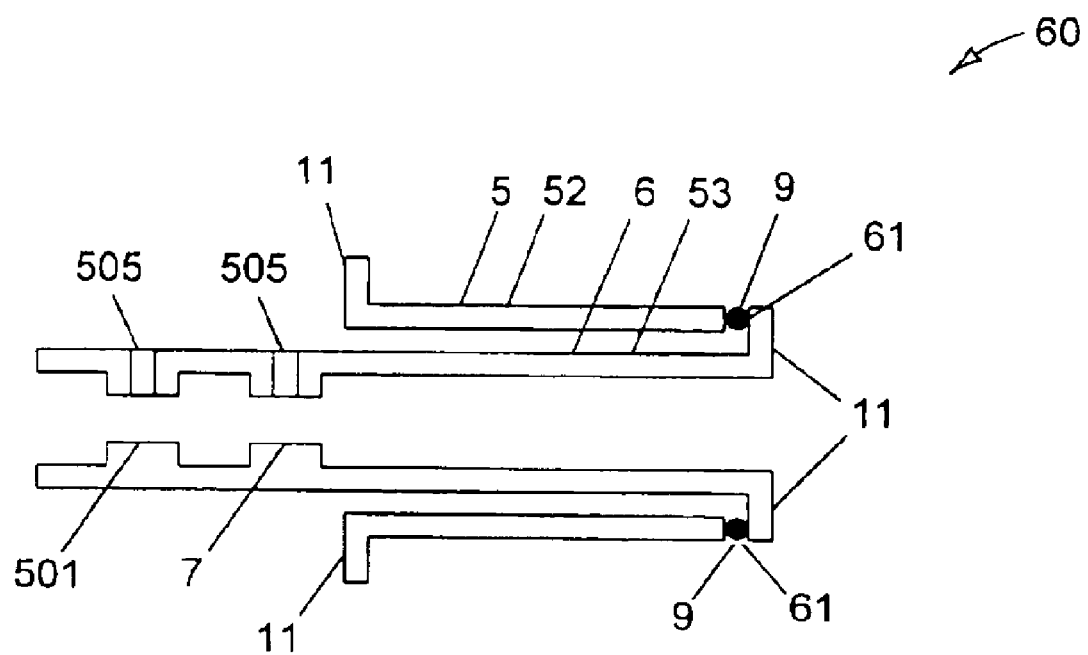
FIG. 6 depicts an interim assembly.

FIG. 6 depicts the second and third cylinder 52, 53 joined with a first fixing means 61 during manufacture to form an interim assembly 60. Referring again to FIG. 5, the first cylinder 51 is joined to the interim assembly 60 using a second fixing means 56. It is preferable that the first and second fixing means 61, 56 are hermetic seals. The first and second fixing means 61, 56 can be a laser weld, a metal solder, a Eutectic, a glass solder, an adhesive, an epoxy, a UV cured adhesive, a thermally cured adhesive, any weld or brazing technique, or a mechanic fixing means such as a screw, an interference fit or a clamp.

It is preferable that the second fixing means 56 is a laser weld, and that the operating wavelength is tuned to a desired wavelength while joining the first cylinder 51 to the interim assembly 60.

The optical filter 1 can be of such a design that the difference between the length of the thermal compensation device and the length of the optical component 2 is independent of the length of the optical component 2. This allows the same package design and hardware to be used for example to package fiber Bragg gratings of any length that is smaller than the length of the thermal compensation device. Advantageously, the length of the thermal compensation device 3 can be less than 20 mm longer than the longitudinal length separating the first and the second fixing points 7, 8. Longer optical filters, for example 30 mm or 50 mm longer, can also be designed using this approach, although shorter optical filters are generally more desirable. The approach can also be used to athermally package very-long optical components with the same degree of athermalisation. An example is a dispersion compensating fiber Bragg grating that is 150 mm long and housed in a 180 mm package. This design is suitable for packaging fiber Bragg gratings up to 400 mm long or longer. This technique is also suitable for athermally packaging multiple gratings in a single fiber, either in series or in parallel.

FIG. 5 also depicts a hole 57 sealed by a seal 58 which can be solder, a laser welded plug, an adhesive, a glass solder or other form of sealing material. The hole 57 can be used for injecting fluid into the thermal compensation device 1, or purging with gas, or evacuation. The optical fiber component 2 can include pig tails 59 at either or both of its ends. The thermal compensation device 1 further includes a third and fourth fixing point 501, 502 outside of the first and the second fixing points 7, 8. The optical fiber component 2 is attached to the third and the fourth fixing points 501, 502 with a strain relief material 503 such as an adhesive, or an epoxy. The optical fiber component 2 can be bent between the first and third fixing points 7, 501 in order to improve strain isolation of the optical component 2 from externally applied strain. Tubes 504 can be incorporated into the design in order to improve robustness. The tubes 504 can be so-called "boots" or can be plastic or rubber tubing. The thermal compensation device 3 further includes injection holes 505 through which the adhesive 10, glass solder 54, or strain relief material 503 can be inserted or injected.

It is preferred that the first, second and third cylinders 51, 52, 53 have a substantially circular cross-section as shown, and are concentric with the optical fiber component 2. This has the advantage that the optical filter 1 will be circularly symmetric and thus any strain on the optical fiber component 2 will induce a substantially zero bending moment onto the optical filter 1. It is also preferred that the first, second and third cylinders 51, 52, 53 are hermetically sealed (e.g. by seam welding). This has the advantage that moisture can only enter the package through the holes at either end. When the glass solder is flowed, it both attaches the optical fiber component 2 and at the same time blocks the only other path for moisture to enter the package. These features are advantageous for thermal stability, life and reliability reasons.

Figure 7:
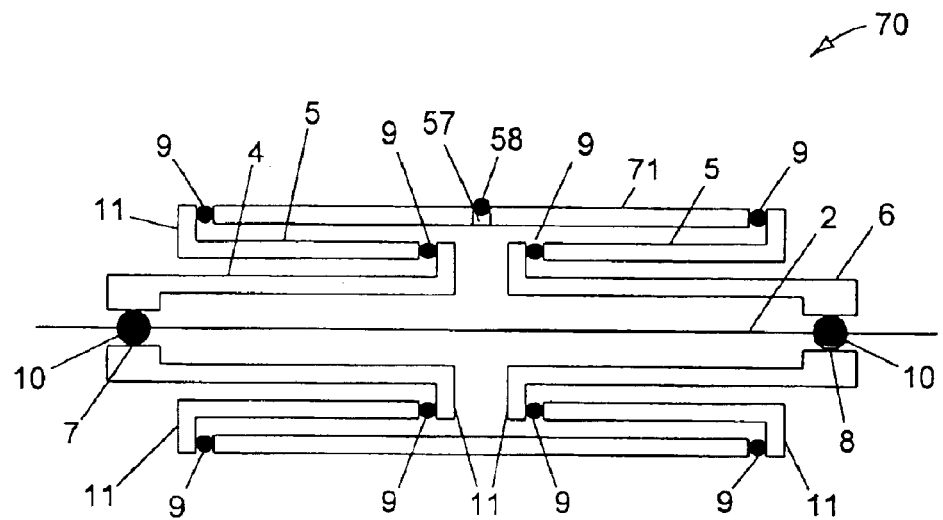
FIG. 7 depicts a symmetrical thermal compensation device.

FIG. 7 depicts a symmetrical thermal compensation device 70 wherein the first and third members 4, 6 are of the same or similar design. The thermal compensation device 70 includes two second members 5 and a fourth member 71 which is preferably cylindrical in form. The fourth member 71 is preferably made from the same material as the first member 4. This design is advantageous for temperature compensating devices of such a length that it is more difficult or expensive to produce the first, second or third members 4, 5, 6 than it would be for the asymmetrical design of FIG. 5. The approach is suitable for packaging fiber Bragg gratings having lengths up to 1 m long, although a larger hole through the first and third members 4, 6 may be required owing to the difficulties of fabricating very-long holes.

Figure 8:
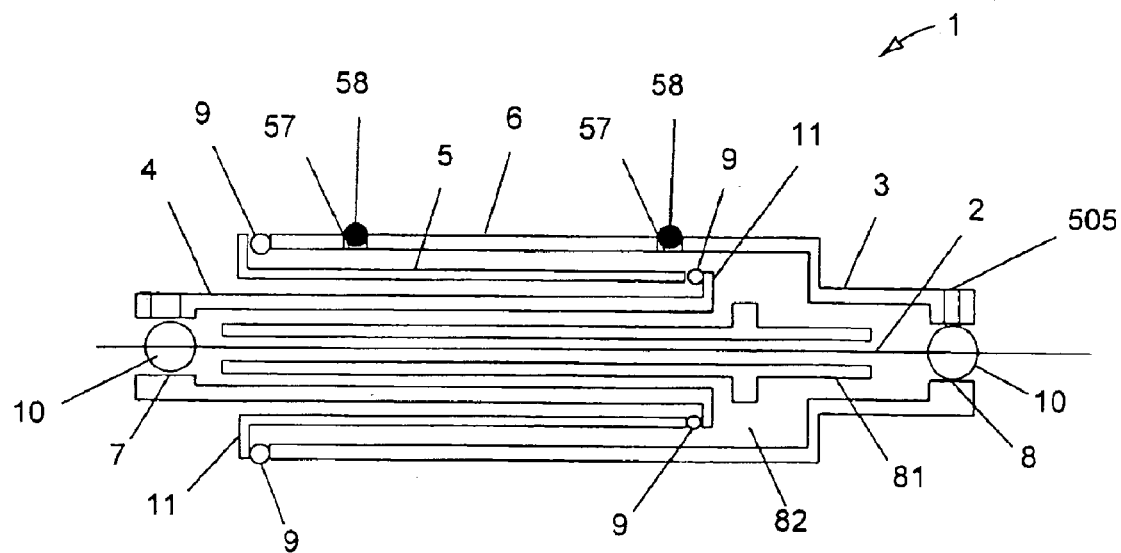
FIG. 8 depicts an optical filter further comprising a heat sink.

FIG. 8 depicts the optical filter 1, and further comprising a heat sink 81 which can be fixed to the first member 4 using an interference fit, a weld or an adhesive, or alternatively the heat sink 81 can simply be inserted. This design is particularly suitable for the packaging of optical fiber components such as fiber lasers, amplifiers or distributed feedback fiber lasers that require thermal management such as heat sinking or heat distribution designed to ensure a substantially uniform temperature profile along the optical fiber component 2. A fluid 82 can be injected into the thermal compensation device 3. The fluid 82 can be oil, grease, a gel, ink, a liquid metal, or a heat-sinking compound, or any of these in combination with a secondary material to change the thermal and/or mechanical properties of the fluid 82. For example, the fluid 82 can be a silver-loaded gel. It is preferable when using the fluid 82 in a sealed environment that there is some expansion means to release pressure. The expansion means can be an air bubble, a compliant component, a diaphragm, a bellows or syntactic foam.

The optical filter 1 can include a plurality of optical fiber components 2 connected in series and/or in parallel.

Figure 9:
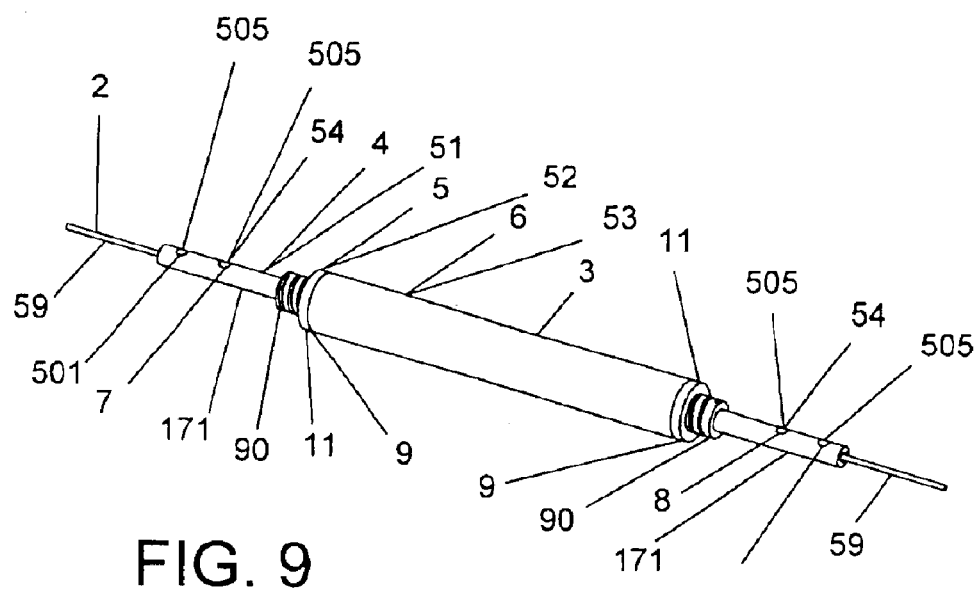
FIG. 9 depicts a preferred embodiment of the optical filter.
Figure 10:
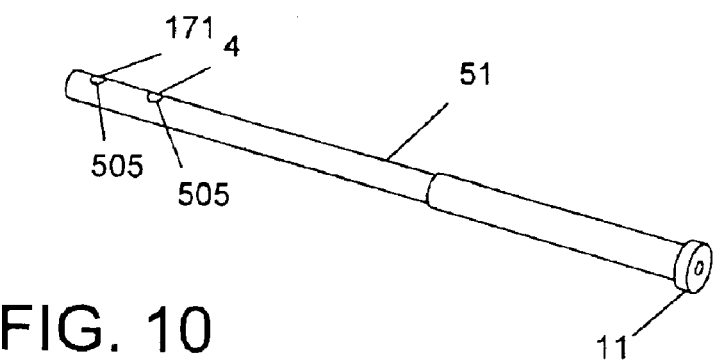
FIG. 10 is a diagram of the first cylinder of FIG. 9.
Figure 11:
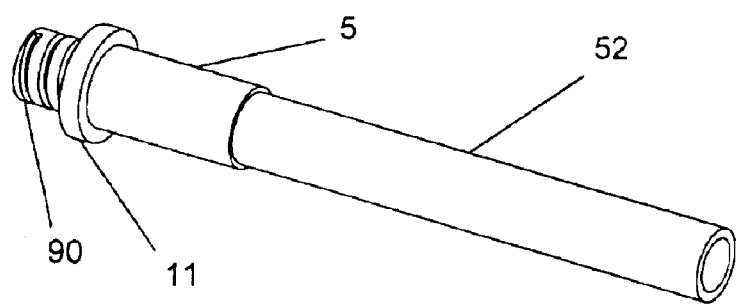
FIG. 11 is a diagram of the second cylinder of FIG. 9.
Figure 12:
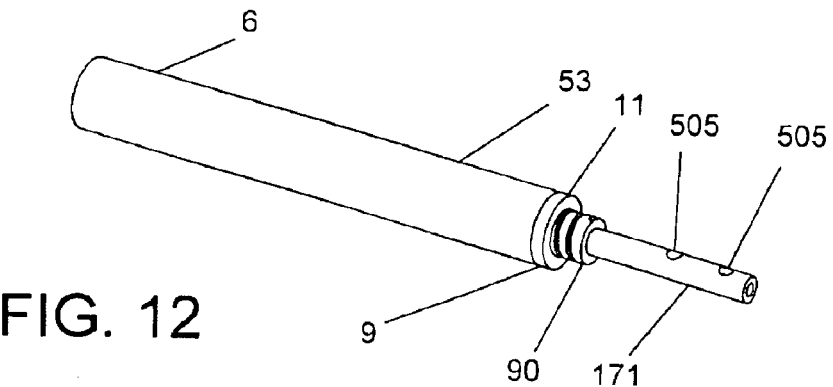
FIG. 12 is a diagram of the third cylinder of FIG. 9.

FIG. 9 depicts a preferred embodiment of the optical filter 1. The first, second and third cylinders 51, 52, 53 are cylindrical and are shown in detail in FIGS. 10, 11 and 12. The second and third cylinders 52, 53 include threads 90 which can be used for external fixturization and further protection of the optical fiber component 2 as it exits the thermal compensation device 3.

Referring to FIG. 9, the optical filter 1 can be manufactured by inserting the optical fiber component 2 into the thermal compensation device 3, applying strain to the optical fiber component 2, and flowing the glass solder 54 to attach the optical fiber component 2 to the thermal compensation device 3 at the first and the second fixing points 7, 8.

It is preferred that the operating wavelength 30 is measured prior to flowing the glass solder 54 or other adhesive 10 in order to assess the strain required to tune the operating wavelength 30 to the desired wavelength 31. The strain can be adjusted while flowing the glass solder 54.

The optical fiber component 2 can be attached to the first fixing point 7 prior to tuning the operating wavelength 30 to the desired wavelength 31.

In another embodiment the present invention provides for a method of manufacturing an optical filter. The optical filter includes an optical fiber component attached to a thermal compensation device at first and second fixing points. The method includes inserting the optical fiber component into the thermal compensation device and applying strain to the optical fiber component. Glass solder is then flowed to attach the optical fiber component to the thermal compensation device at the first and the second fixing points.

The method can further include the steps of measuring and feeding back the operating wavelength 30 while flowing the glass solder 54 in order to tune the operating wavelength 30 to the desired wavelength 31. This is a particularly advantageous aspect of the invention because the steps of measuring and feeding back the operating wavelength 30 while flowing the glass solder 54 can be carried out more than once including at a much later date if it is desired to retune the optical fiber component 2. This offers considerable advantages, perhaps the most important being the improvement in manufacturing yield. It also allows product to be manufactured and then the wavelength to be set at a later date. This feature is very important because it reduces the requirement to hold inventory of many different wavelengths for various optical filter designs.

The glass solder 54 can be flowed using a heating method selected from the group comprising an induction heater, a resistance welder, an electric current heating technique, hot gas, hot glass injection and direct heating.

The method can also include measuring the operating wavelength 30 of the optical fiber component 2, and flowing the glass solder 54 on either the first or the second fixing point 7, 8 while adjusting the strain applied to the optical fiber component to tune the operating wavelength 30 to the desired wavelength 31.

The optical filter 1 can be environmentally annealed prior to measuring the operating wavelength 30 and flowing the glass solder 54. The annealing can be effected by placing the optical filter in an environmental chamber.

Figure 13:
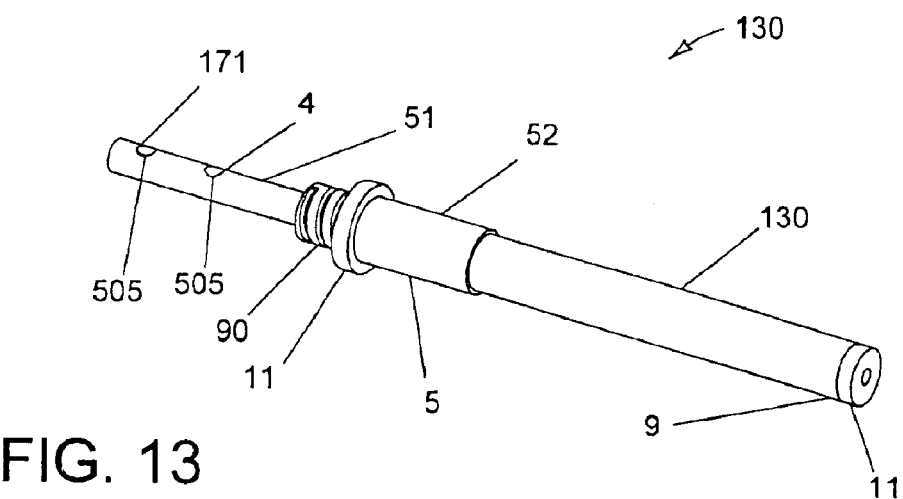
FIG. 13 is a diagram of the interim assembly comprising the first cylinder of FIG. 10 and the second cylinder of FIG. 11.

It is preferred that the first cylinder 51 is laser welded to the second cylinder 52 to form an interim assembly 130 in FIG. 13, and the third cylinder 53 (FIG. 12) is then laser welded to the interim assembly 130.

Figure 14:
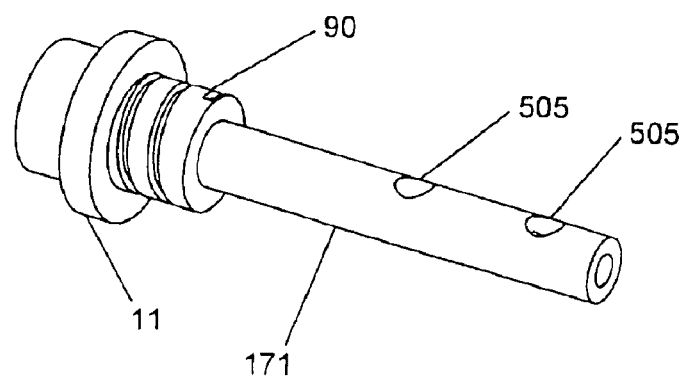
FIG. 14 depicts a detail of the end of the first cylinder of FIG. 10.
Figure 15:
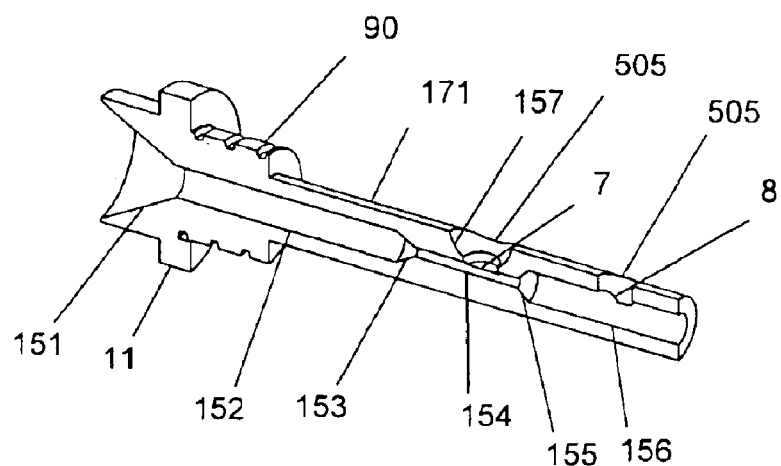
FIG. 15 depicts a further detail of the end of the first cylinder of FIG. 10.

FIGS. 14 and 15 show further details of the end of the third cylinder 53 which is in the form of a ferrule 171. The end of the first cylinder 51 can be of a similar design. The third cylinder 53 includes a first cone 151, a first bore 152, a second cone 153, a second bore 154, a third cone 155, a third bore 156 and a fourth cone 157. The first and second cones 151, 153 assist in the insertion of the optical fiber component 2 into the third cylinder 53. The fourth cone 157 assists with the application of glass solder 54 and is a specifically advantageous feature because it helps to control both the flow of the glass solder 54 and the natural extraction of trapped air generated during the solder process. This results in a better definition of the position of the glass solder 54 and a reduction in the number and size of voids remaining in the glass solder 54 after the process has been completed. Note that the third cylinder 53 typically will not contain each and every feature shown in FIGS. 14 and 15 and in particular will preferably contain only one of these features.

Figure 16:
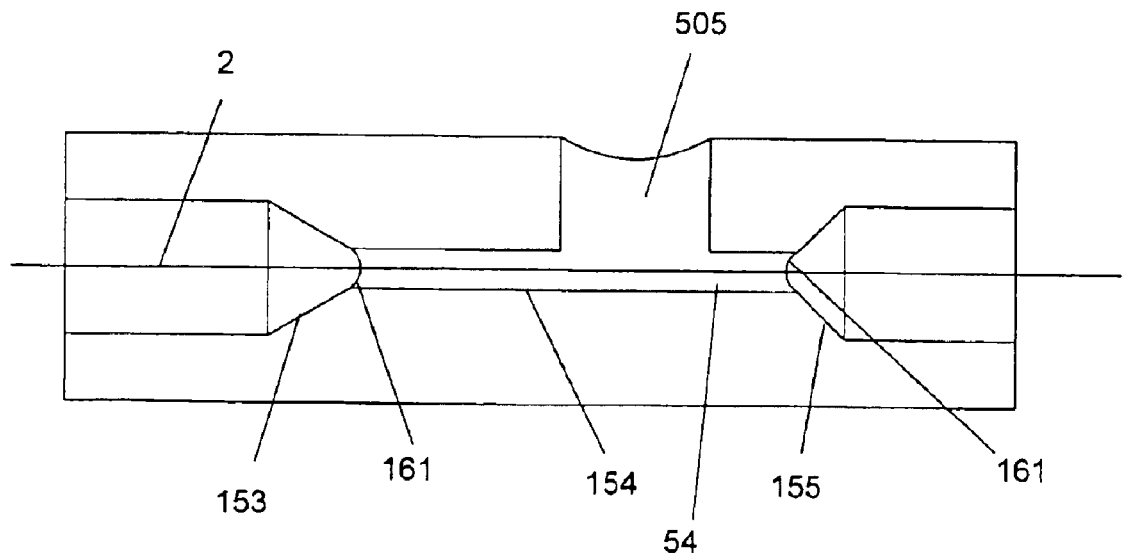
FIG. 16 depicts the meniscus that forms in the glass solder when attaching the optical fiber component to the thermal compensation device.

FIG. 16 depicts a meniscus 161 that forms when the optical fiber component 2 is attached to the thermal compensation device 3 by the glass solder 54. The design is advantageous because the second cone 153 helps define the position of the first fixing point 7 by the meniscus 161 formed on flowing the glass solder 54. This is important because it determines the accuracy with which the composite thermal expansion can be defined.

This method of tuning an optical filter 1 whilst flowing or reflowing an adhesive 10 or a glass solder 54 can also be applied to an optical filter 1 in which the thermal compensation device 3 includes a single mechanical component that can be formed from a negative expansion coefficient material such as a glass or a ceramic.

This method of tuning an optical filter 1 whilst flowing or reflowing an adhesive 10 or a glass solder 54 can also be applied to an optical filter 1 in which the thermal compensation device 3 includes more than one mechanical component that can be formed from materials including negative expansion coefficient materials such as a glass or a ceramic.

An alternative method of producing the optical filter 1 shown in FIG. 9 is to laser weld the first and second cylinders 51, 52 together to form the interim assembly 130, attaching the optical fiber component 2 to one of the interim assembly 130 and the third cylinder 53, attaching the optical fiber component 2 to the other one of the interim assembly 130 and the third cylinder 53, applying strain to the optical fiber component 2, and laser welding the third cylinder 53 to the interim assembly 130.

The third cylinder 53 can be assembled onto the interim assembly 130 prior to attaching the optical fiber component 2 to either the interim assembly 130 or the third cylinder 53.

It is preferred that, prior to laser welding the third cylinder 53 to the interim assembly 130, the operating wavelength 30 of the optical fiber component 2 is measured so that the strain applied to the optical fiber component 2 can be adjusted to tune the operating wavelength 30 to the desired wavelength 31.

The optical fiber component 2 can be attached to the thermal compensation device 3 using a glass solder 54.

The steps of measuring and feeding back the operating wavelength 30 can be carried out while flowing the glass solder 54 in order to tune the operating wavelength to the desired wavelength. The steps of measuring and feeding back the operating wavelength 30 while flowing the glass solder 54 can be carried out more than once. The glass solder 54 can be flowed using a heating method selected from the group comprising an induction heater, a resistance welder, an electric current heating technique, hot gas, hot glass injection and direct heating.

Figure 17:
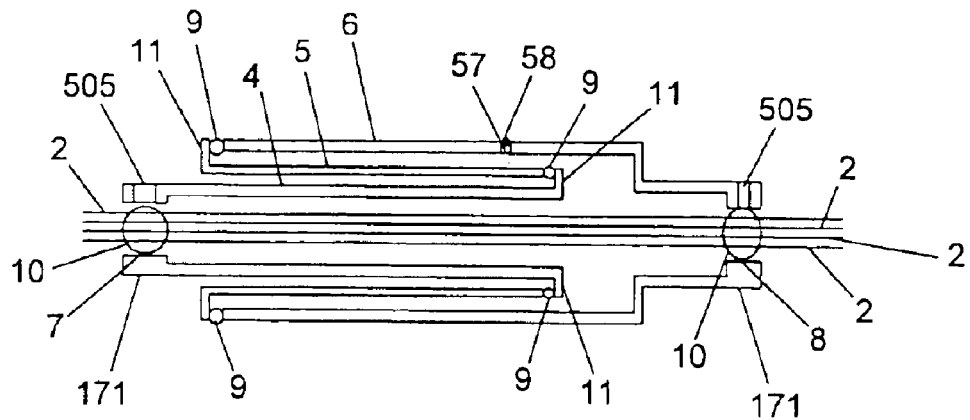
FIG. 17 depicts an optical filter comprising a plurality of optical fiber components.
Figure 18:
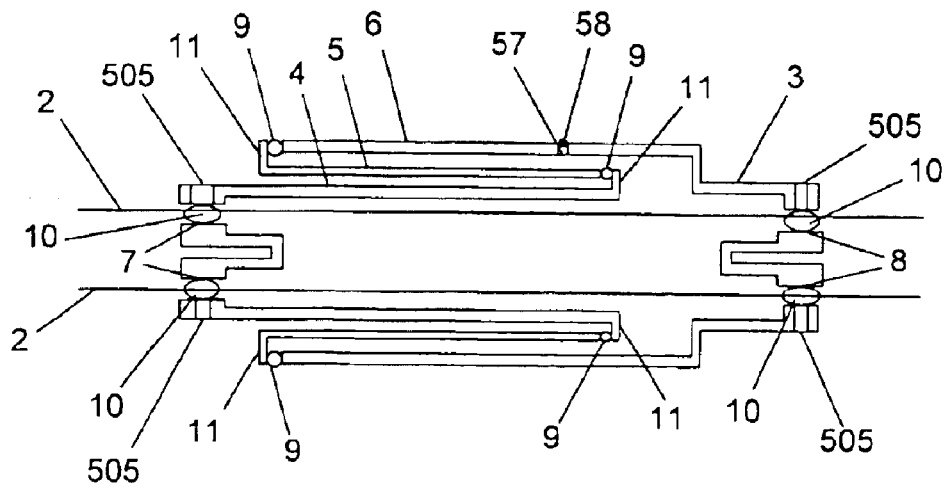
FIG. 18 depicts an optical filter comprising a plurality of ferrules.

FIGS. 17 and 18 show optical filters 170 and 180 comprising a plurality of optical fiber components 2 configured in parallel to each other, each fiber component 2 exiting the thermal compensation device 3 in a ferrule 171 which is shown as part of the first and third cylinders 51, 53. The optical fiber components 2 in the optical filter 170 are contained within the same ferrule 171 at each end, whereas the optical fiber components 2 in the optical filter 180 are contained in multiple ferrules 171.

Figure 19:
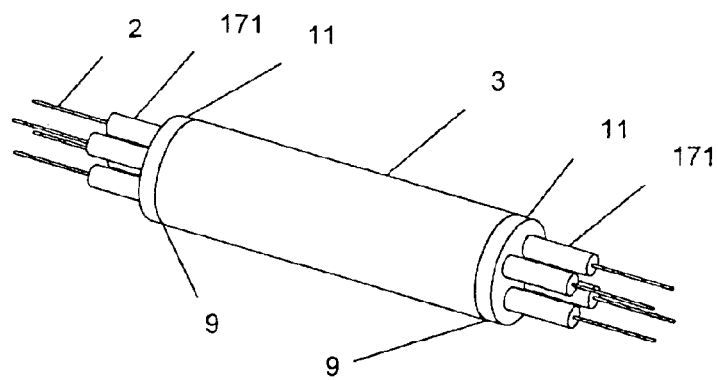
FIG. 19 depicts an optical filter comprising a plurality of optical fiber components each exiting the thermal compensation device in a separate ferrule.

The embodiment shown in FIG. 18 is a preferred embodiment. A similar embodiment is shown in more detail in FIG. 19. This embodiment is preferred because each of the optical components 2 can be tuned and retuned individually with the methods described with reference to FIG. 9.

The materials, lengths and dimensions of the first, second and third cylinders 51, 52, 53 are obviously dependent upon the design and performance specification required for the optical filter. Suitable materials for packaging fiber Bragg grating devices include for the first and third cylinders include glasses such as silica, Schott Zerodor, Corning ULE alloys such as Invar® (alloy (Invar® is a registered trademark of Imphy S. A. Corporation of France Paris France), Kovar® alloy (Kovar® is a registered trademark of Westinghouse Electric & Manufacturing Company Corporation of Pittsburgh Pa.), super-invar, or metals such as titanium, materials such as carbon, silicon or any other low or negative expansion coefficient materials including ceramics. Suitable materials for the second cylinder include high-expansion glasses, metals such as aluminum, copper, tin or alloys thereof, stainless steel or high-expansion ceramics.

Figure 20:
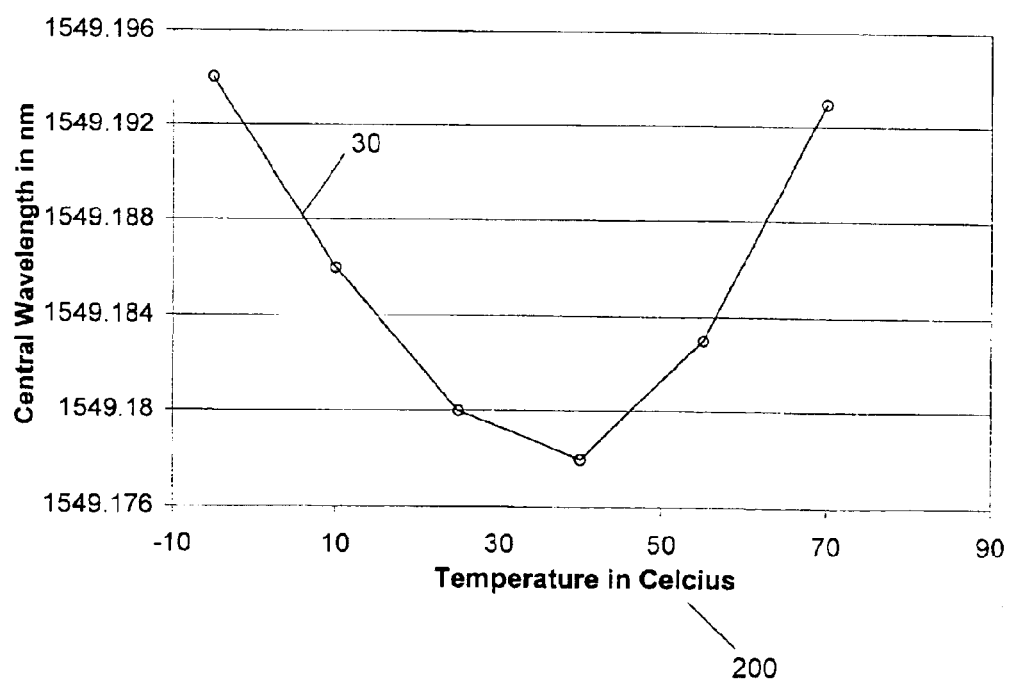
FIG. 20 depicts the measured performance of a fiber Bragg grating according to the present invention.

FIG. 20 depicts the measured performance of an optical filter 1 comprising a fiber Bragg grating according to the present invention. The operating wavelength 30 is plotted as a function of temperature 200 and is shown to vary by less than 16 pm over the temperature range −5° C. to +70° C.

In one example, it is desirable for a 100 GHz dense wavelength division multiplexing (DWDM) optical network that the optical filter is of such a design that the operating wavelength can be tuned to within 10 pm of a desired wavelength at an ambient temperature and remains such after cycling the operating temperature over the range −40° C. to +90° C. It is also desirable that the optical filter has a temperature-dependent wavelength variation of less than 35 pm over the range −5° C. to +70° C. It is further desirable that the operating wavelength does not drift by more than 10 pm over the 25 year operating lifetime of the filter at a fixed temperature.

In another example, it is desirable for a 50 GHz DWDM optical network that the optical filter is of such a design that the operating wavelength can be tuned to within ±10 pm of a desired wavelength at an ambient temperature and remains such after cycling the operating temperature over the range −40° C. to +90° C. It is also desirable that the optical filter has a temperature-dependent wavelength variation of less than 35 pm over the range −5° C. to +70° C. It is further desirable that the operating wavelength does not drift by more than 10 pm over the 25 year operating lifetime of the filter at a fixed temperature.

In yet another example, it is desirable for a 25 GHz DWDM optical network that the optical filter is of such a design that the operating wavelength can be tuned to within ±5 pm of a desired wavelength at an ambient temperature and remains such after cycling the operating temperature over the range −40° C. to +90° C. It is also desirable that the optical filter has a temperature-dependent wavelength variation of less than 30 pm over the range −5° C. to +70° C. It is further desirable that the operating wavelength does not drift by more than 10 pm over the 25 year operating lifetime of the filter at a fixed temperature.

In a further example, it is desirable for a 12.5 GHz DWDM optical network that the optical filter is of such a design that the operating wavelength can be tuned to within ±3 pm of a desired wavelength at an ambient temperature and remains such after cycling the operating temperature over the range −40° C. to +90° C. It is also desirable that the optical filter has a temperature-dependent wavelength variation of less than 20 pm over the range −5° C. to +70° C. It is further desirable that the operating wavelength does not drift by more than 5 pm over the 25 year operating lifetime of the filter at a fixed temperature.

In still another example, it is desirable for a 6.25 GHz DWDM optical network that the optical filter is of such a design that the operating wavelength can be tuned to within ±2 pm of a desired wavelength at an ambient temperature and remains such after cycling the operating temperature over the range −40° C. to +90° C. It is also desirable that the optical filter has a temperature-dependent wavelength variation of less than 6 pm over the range −5° C. to +70° C. It is further desirable that the operating wavelength does not drift by more than 4 pm over the 25 year operating lifetime of the filter at a fixed temperature.

In one further example, it is desirable for a DWDM optical network having a channel separation between 1 GHz and 6.25 GHz that the optical filter is of such a design that the operating wavelength can be tuned to within ±1 pm of a desired wavelength at an ambient temperature and has a temperature-dependent wavelength variation of less than 3 pm over the range −5° C. to +70° C.

Figure 21:
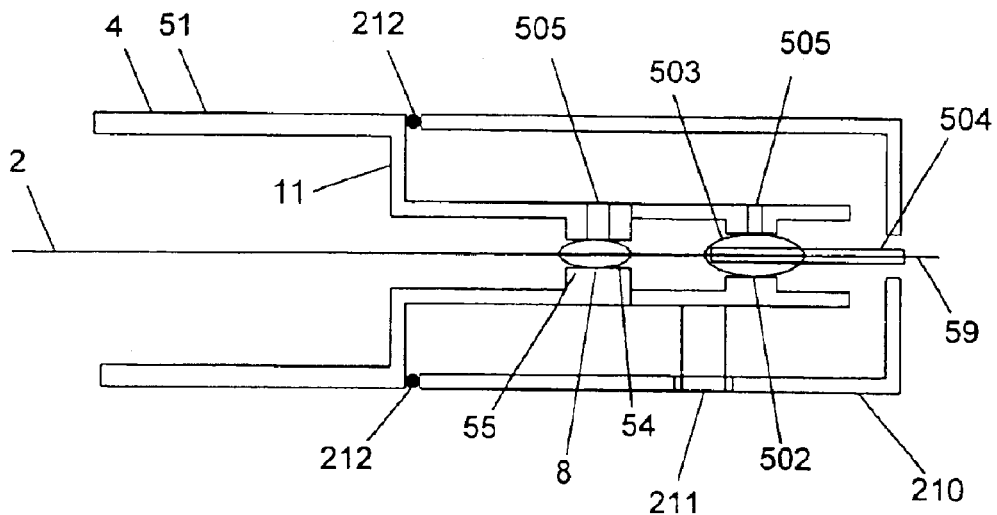
FIG. 21 depicts an end cap for tuning an optical filter.

FIG. 21 depicts an end cap 210 attached to the first cylinder 51 of FIG. 5 with a fixing means 212. The fixing means 212 can be of the same type as fixing means 9, or can be a screw or interference fit. The end cap 210 comprises a screw 211 that can be used to tune the operating wavelength 30. The screw 211 can be replaced by a grubscrew, a deformable member, or can be replaced with an actuator to provide automatic tuning.

Figure 22:
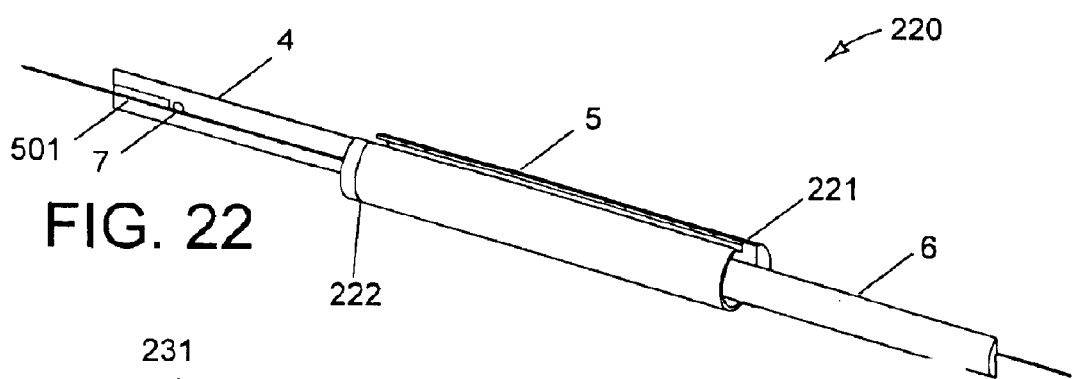
FIG. 22 depicts a package comprising a slot cut through each of the first, second and third members.
Figure 23:
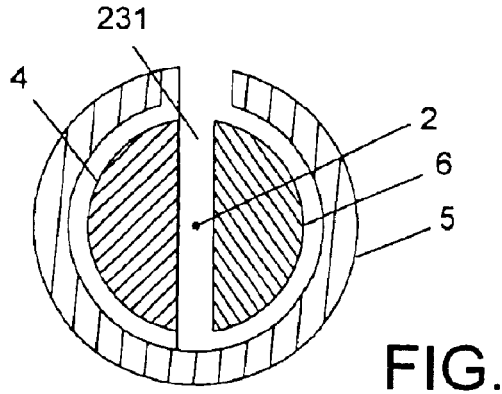
FIG. 23 depicts a cross-section of the package shown in FIG. 22.

FIG. 22 depicts an optical filter 220 in which the first member 4 is joined to the second member 5 at fixing point 221, and the second member 5 is joined to the third member 6 at fixing point 222. FIG. 22 depicts a cross-section of the optical filter 1 and depicts a slot 231. In manufacture, material that will form the first, second and third members 4, 5, 6 can be welded together and the slot 231 machined in order to form the first, second and third members 4, 5, 6. Machining the slot 231 in one operation provides a route to cost reduction. The first and third members 4, 6 can be made from a nickel alloy such as Invar, and the second member 5 can be made from stainless steel.

Figure 24:
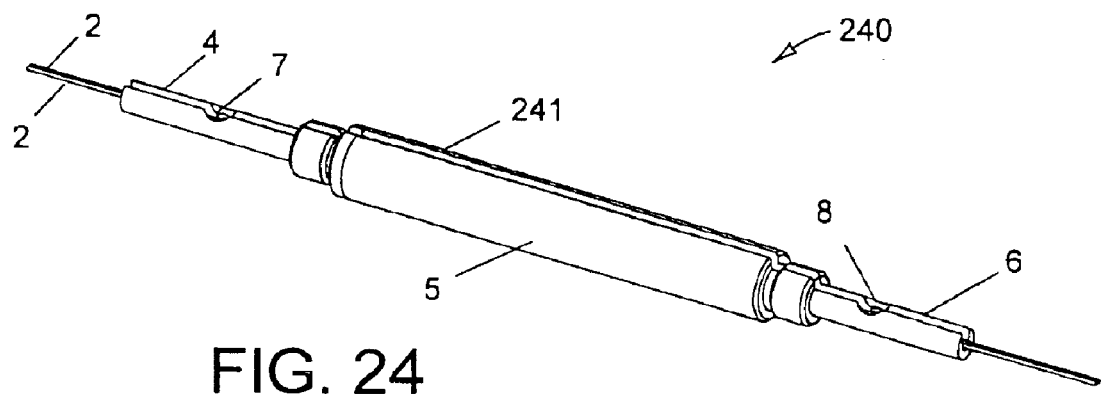
FIG. 24 depicts a package with a slot that can house more than one optical component.
Figure 25:
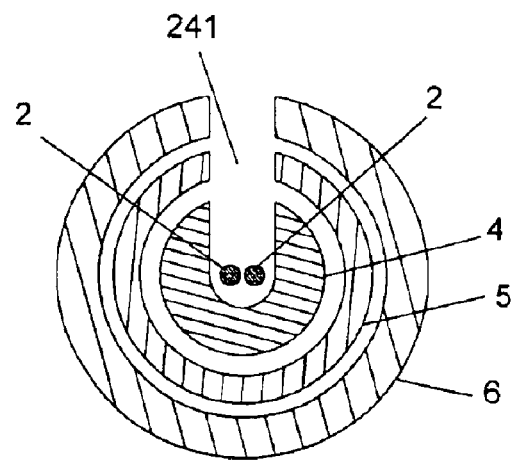
FIG. 25 depicts a cross-section of the package shown in FIG. 24.

FIG. 24 depicts an optical filter 240 that also comprises a slot 241 cut into the first, second and third members 4, 5, 6. The optical filter 240 is shown in cross section in FIG. 25. This approach also benefits from cheaper manufacture.

The optical filters 220 and 240 can be used with one optical fiber component 2 as shown in FIG. 22, or with a plurality of optical fiber components 2 as shown in FIG. 24.

Figure 26:
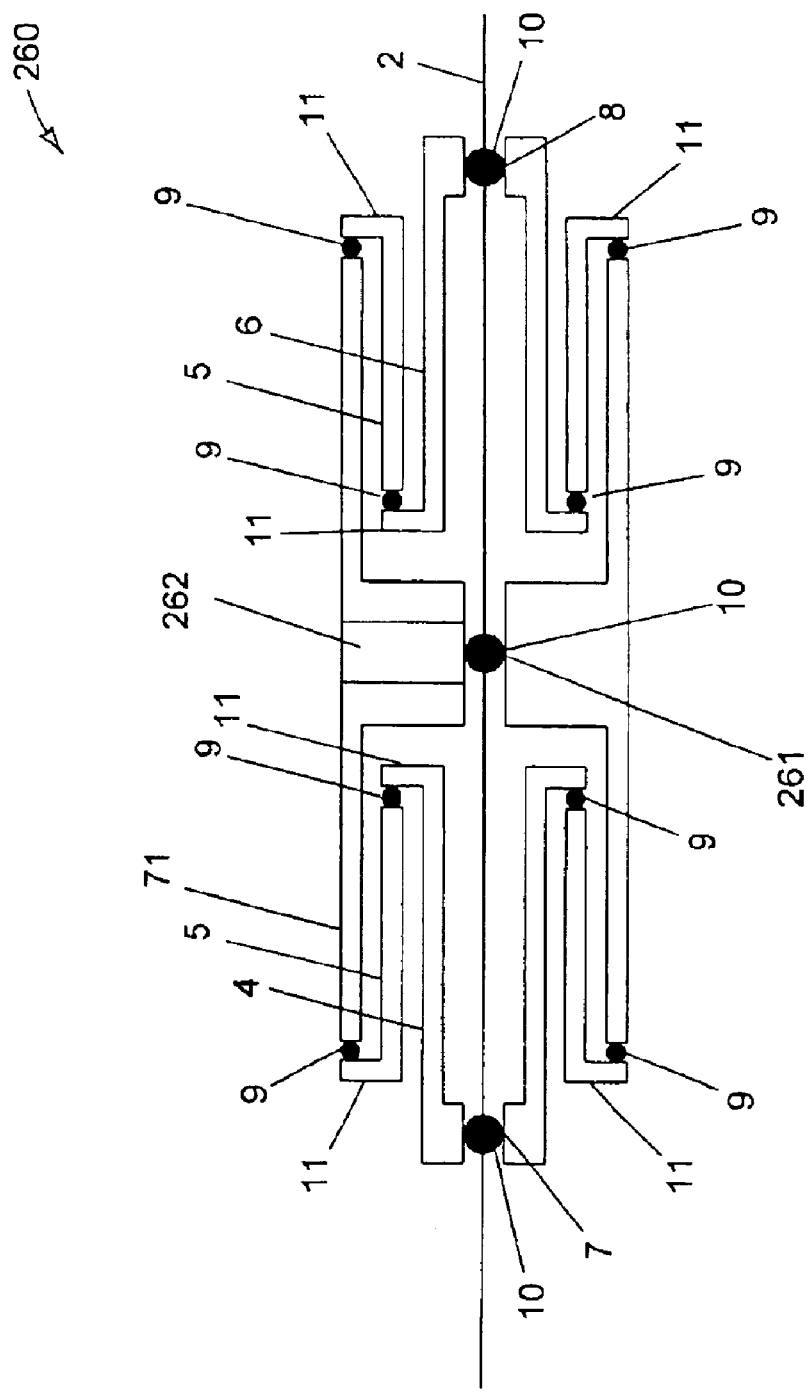
FIG. 26 depicts a package for two optical components connected in series in which each of the two optical components can be separately tuned.

FIG. 26 depicts an optical filter 260 which is similar to the design shown in FIG. 7 except that it comprises a central fixing point 261 accessed through a hole 262 in the fourth member 71. The optical fiber component 2 can be fixed to the fourth member 71 by the adhesive means 10. The central fixing point 261 allows two optical components to be packaged which can be of the same or different type. For example, the optical filter 260 can comprise two fiber Bragg gratings, a fiber Bragg grating and a DFB fiber laser grating, or two DFB fiber laser gratings, and these optical components can be tuned to the same or different wavelengths.

Figure 27:
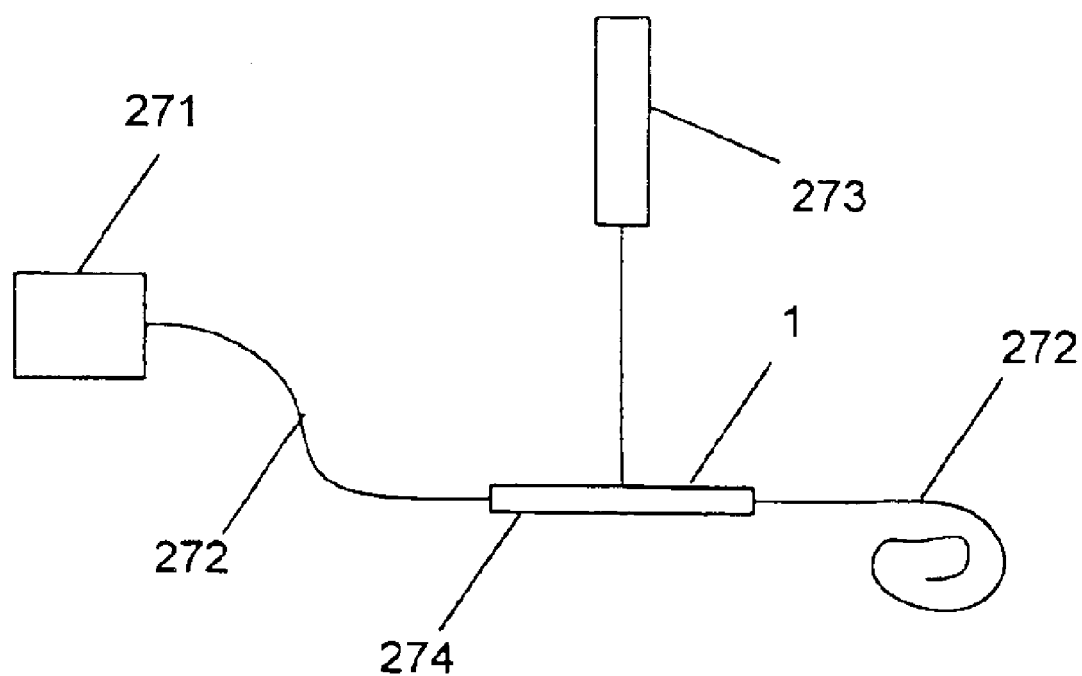
FIG. 27 depicts an apparatus for tuning the operating wavelength of an optical filter with a laser.

FIG. 27 depicts apparatus for post tuning an optical filter 1. The optical filter 1 is connected to test equipment 271 via optical fiber 272. A laser 273 is pulsed at the outer package 274 of the optical filter 1. A single pulse from the laser 273 causes the wavelength to shift slightly. This process can be repeated until the operating wavelength 30 becomes sufficiently close to the desired wavelength 31. This process has been used to tune optical filters of a design similar to that shown in FIG. 9 to within 1 pm. In these designs, the operating wavelength 30 was initially set to be greater than the desired wavelength 31. The laser 273 was a 100 W average power, pulsed Nd:YAG laser. The test equipment included standard instrumentation used to characterize fiber Bragg grating, and included tuneable lasers, a detector and test software.

While the above invention has been described in language more or less specific as to structural and methodical features, it is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A method of manufacturing an optical filter wherein the optical fiber component is characterized by an operating wavelength of a selected wavelength, and wherein the optical filter comprises an optical fiber component attached to a thermal compensation device at first and second fixing points, the method comprising:
   i. inserting the optical fiber component into the thermal compensation device;
   ii. applying strain to the optical fiber component;
   iii. flowing glass solder to attach the optical fiber component to the thermal compensation device at the first and the second fixing points;
   iv. measuring the operating wavelength of the optical fiber component;
   v. adjusting the strain applied to the optical fiber component to tune the operating wavelength to the selected wavelength; and
   vi. allowing the glass solder to solidify;
   wherein the step of measuring the operating wavelength of the optical fiber component is carried out prior to adjusting the strain applied to the optical fiber component to tune the operating wavelength, and the step of allowing the glass solder to solidify is carried out after adjusting the strain applied to the optical fiber component to tune the operating wavelength.

2. The method of claim 1, and further comprising adjusting the strain while flowing the glass solder.

3. The method of claim 1, and wherein the optical fiber component is attached to the first fixing point prior to tuning the operating wavelength to the selected wavelength.

4. The method of claim 2, and further comprising measuring and feeding back the operating wavelength while flowing the glass solder in order to tune the operating wavelength to the selected wavelength.

5. The method of claim 4, and wherein the measuring and feeding back of the operating wavelength while flowing the glass solder are carried out more than once.

6. The method of claim 4, and wherein the measuring and feeding back of the operating wavelength while flowing the glass solder is continued until the operating wavelength is within a desired amount of the desired wavelength.

7. The method of claim 5, and wherein the desired amount of the desired wavelength is one of +/−10 pm, +/−5 pm, +/−2 pm, or +/−1 pm.

8. The method of claim 1, and wherein the glass solder is flowed using a heating method selected from the group comprising induction heating, an electric current heating method, resistance welding, a hot gas method, a hot glass injection method, and a direct heating method.

9. The method of claim 8, and further comprising:
   measuring the operating wavelength of the optical fiber component; and
   ii. flowing the glass solder on either the first or the second fixing point while adjusting the strain applied to the optical fiber component to tune the operating wavelength to the desired wavelength.

10. The method of claim 9, and further comprising, prior to measuring the operating wavelength and flowing the glass solder, thermally annealing the optical filter.

11. The method of claim 1, and wherein the thermal compensation device comprises a first member, a second member, and a third member, and wherein the thermal compensation device is formed by laser welding the first, the second and the third members together.

12. The method of claim 1, and wherein the thermal compensation device further comprises third and fourth fixing points outside of the first and the second fixing points, and wherein the method further comprises attaching the optical fiber component to the third and the fourth fixing points to provide strain relief.

13. The method of claim 12, and wherein the optical fiber component is bent between the first and third fixing points.

14. The method of claim 1, and further comprising injecting a fluid into the thermal compensation device.

15. The method of claim 14, and wherein the fluid is selected from the group comprising an oil, a grease, a gel, an ink, a liquid metal, and a heat-sinking compound.

16. The method of claim 1, and wherein the optical fiber component is a distributed feedback fiber laser, and the thermal compensation device further comprises a heat sink.

17. The method of claim 16, and wherein the heat sink is laser welded to the first member.

* * * * *